United States Patent
Hsu et al.

(10) Patent No.: US 8,497,451 B2
(45) Date of Patent: Jul. 30, 2013

(54) BRITTLE NONMETALLIC WORKPIECE AND METHOD AND DEVICE FOR MAKING SAME

(75) Inventors: Mu-Chi Hsu, Taipei Hsien (TW); Qing Liu, Shenzhen (CN); Guo-Han Yue, Shenzhen (CN); Chi-Lu Chih, Taipei Hsien (TW); Jun-Qi Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1227 days.

(21) Appl. No.: 12/141,091

(22) Filed: Jun. 18, 2008

(65) Prior Publication Data

US 2009/0159580 A1  Jun. 25, 2009

(30) Foreign Application Priority Data

Dec. 24, 2007  (CN) .......................... 2007 1 0203368

(51) Int. Cl.
- *B23K 26/00* (2006.01)
- *C03B 33/02* (2006.01)
- *C03B 33/09* (2006.01)

(52) U.S. Cl.
USPC ............... 219/121.79; 219/121.84; 225/2; 225/94; 65/269; 372/9

(58) Field of Classification Search
USPC ............. 219/121.67–121.69, 121.72, 121.79, 219/121.84, 121.78; 225/2, 93, 94, 96; 372/9; 65/269, 273; 125/23.01; 438/463

See application file for complete search history.

(56) References Cited

U.S. PATENT DOCUMENTS

| | | | | |
|---|---|---|---|---|
| 4,694,139 A | * | 9/1987 | Roder | 219/121.78 |
| 5,138,131 A | * | 8/1992 | Nishikawa et al. | 219/121.67 |
| 5,247,155 A | * | 9/1993 | Steen et al. | 219/121.83 |
| 5,609,284 A | * | 3/1997 | Kondratenko | 225/1 |
| 6,406,584 B1 | * | 6/2002 | Grossman et al. | 156/254 |
| 6,501,047 B1 | * | 12/2002 | Xuan et al. | 219/121.69 |
| 2004/0251290 A1 | * | 12/2004 | Kondratenko | 225/2 |

FOREIGN PATENT DOCUMENTS

| | | | |
|---|---|---|---|
| CN | 1408498 A | | 4/2003 |
| CN | 101048255 A | | 10/2007 |
| JP | 2001047264 A | * | 2/2001 |
| TW | 521020 | | 2/2003 |
| TW | 200704605 A | | 2/2007 |
| TW | 200738388 A | | 10/2007 |
| WO | WO2005123324 A1 | | 12/2005 |

* cited by examiner

*Primary Examiner* — Samuel M Heinrich
(74) *Attorney, Agent, or Firm* — Altis Law Group, Inc.

(57) ABSTRACT

An exemplary brittle non-metallic workpiece (70) is made by the laser beam (31), a cutting surface (701) of the brittle non-metallic workpiece has no micro cracks. A method for making the brittle non-metallic workpiece includes: focusing a laser beam on the brittle non-metallic substrate to form an elliptic beam spot; driving the laser beam to move along a predetermined curved cutting path, making a center of a major axis of the elliptic beam spot intersecting along the predetermined curved cutting path and the major axis being tangent to the predetermined curved cutting path at the intersecting point; a coolant stream following the elliptic beam spot to move, thus producing a crack in the brittle non-metallic substrate corresponding to the predetermined curved cutting path; separating the brittle non-metallic substrate along the crack. A laser cutting device (40) for making the same is also provided.

10 Claims, 10 Drawing Sheets

BRITTLE NONMETALLIC WORKPIECE AND METHOD AND DEVICE FOR MAKING SAME

BACKGROUND OF THE INVENTION

1. Field of the Invention

The present invention relates generally to brittle nonmetallic workpieces and methods and devices for making the same, more particularly to a brittle nonmetallic workpiece with a curved edge and a method and a laser cutting device for making the same.

2. Discussion of the Related Art

Typical methods for cutting glass or other brittle nonmetallic substrates are based on the use of a diamond or a small rotary cutter to first produce a scribed line in the glass, in order to then split the glass by application of an external mechanical force along the scribed line. A disadvantage of this method is that the scribed line causes fragments to be released from the surface. The fragments stay on the glass and make scratch to it. Furthermore, the micro-cracks produced in the cut edge during the scribing process lead to reduce mechanical stressability, that is, to increase risk of breakage. An approach for preventing the formation of fragments as well as chips and micro-cracks is to cut glass based on thermally induced mechanical tension. In this approach, a laser beam emitting from a laser cutting device, directed at the glass is moved at a predetermined speed relative to the glass, thereby producing a crack in the glass. Then, the glass is split mechanically.

Figure 8:
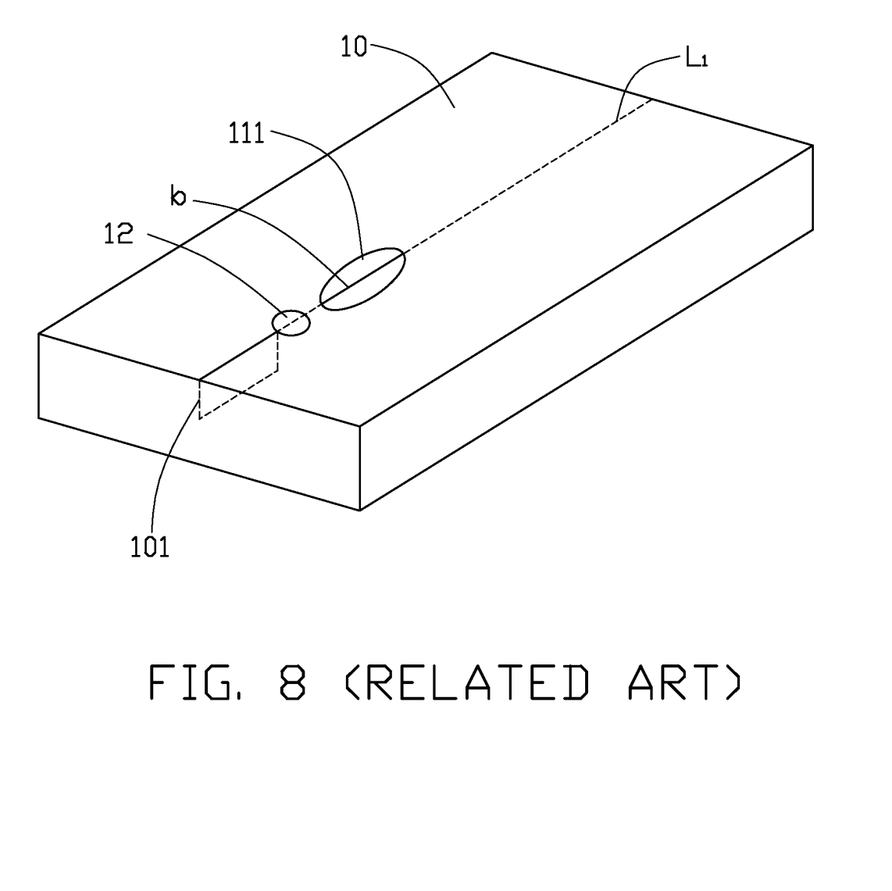
FIG. 8 is an isometric view of a brittle nonmetallic substrate being cut along a predetermined cutting straight line by a conventional laser cutting method.

Referring to FIG. 8, a typical laser cutting method for cutting a brittle nonmetallic substrate 10 includes following steps. An original crack 101 is formed on a surface of a brittle nonmetallic substrate 10 with a diamond cutter. The original crack 101 overlaps a starting point of a predetermined cutting straight line $L_1$. A laser beam is focused on the brittle nonmetallic substrate 10 to form an elliptic beam spot 111. The elliptic beam spot 111 moves along the predetermined cutting straight line $L_1$ from the original crack 101, and keeps a major axis b of the elliptic beam spot 111 aligned with the predetermined cutting straight line $L_1$. Therefore, a thermal energy of the elliptic beam spot 111 is symmetrically distributed at two sides along the predetermined cutting straight line $L_1$. Simultaneously, a sprayer follows the elliptic beam spot 111, and ejects a coolant stream 12 on the brittle nonmetallic substrate 10 along the predetermined cutting straight line $L_1$. As a result, a crack is formed in the brittle nonmetallic substrate 10 along the predetermined cutting straight line $L_1$. However, if a predetermined cutting line is curved, the major axis b of the elliptic beam spot 111 cannot be substantially aligned along a tangent of a specific point on the predetermined cutting line when the brittle nonmetallic substrate moves relative to the laser beam according to the predetermined cutting line. Therefore, the thermal energy of the elliptic beam spot 111 is not symmetrically distributed on the brittle nonmetallic substrate along the predetermined cutting line. Thus, a crack may not be formed according to the predetermined cutting line.

Figure 9:
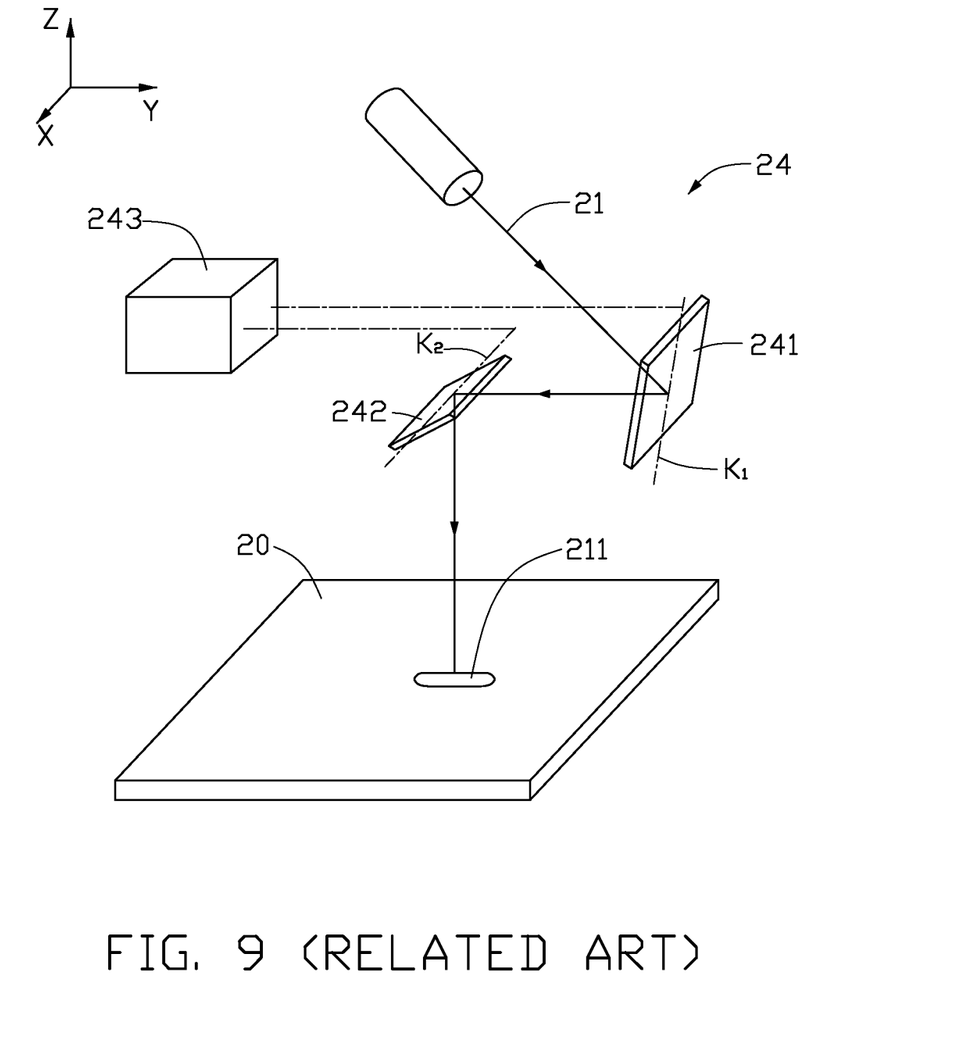
FIG. 9 is an isometric view of a conventional laser cutting device forming a linear beam spot.
Figure 10:
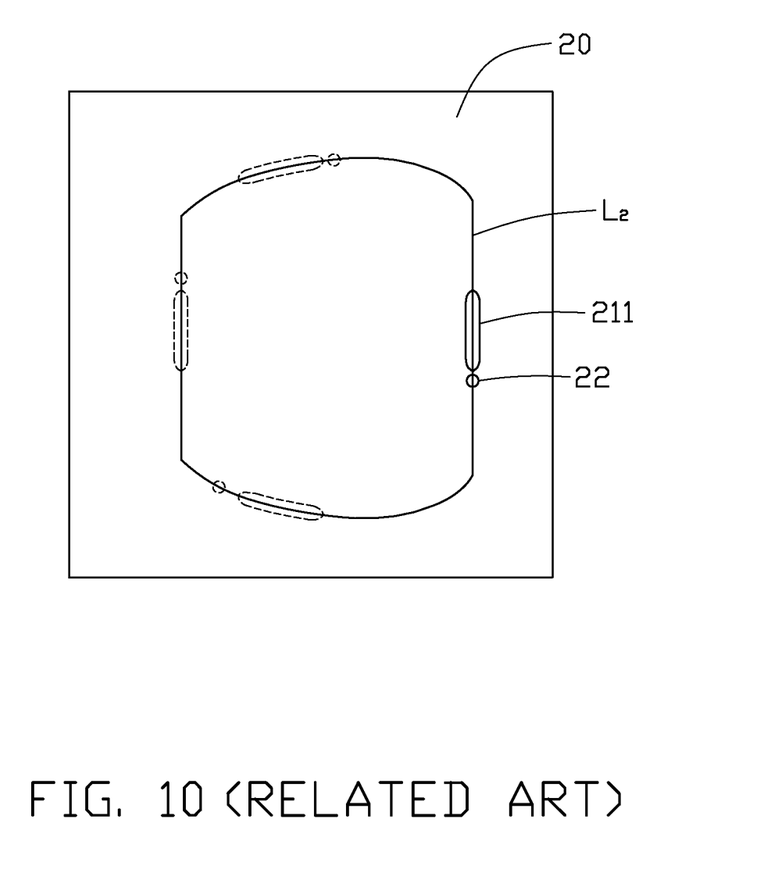
FIG. 10 is an isometric view of the brittle nonmetallic substrate being cut by a linear beam spot of FIG. 9.

Referring to FIGS. 9 and 10, in order to cut a brittle nonmetallic substrate 20 along a predetermined curved cutting path, another typical laser cutting method is provided. A laser beam 21 scans, such as to form a linear beam spot 211 on the brittle nonmetallic substrate 20. A laser cutting device 24 includes a first reflective mirror 241, a second reflective mirror 242, and a controller 243. The first reflective mirror 241 can oscillate about a vertical scanner axis $K_1$, and the second reflective mirror 242 can oscillate about a horizontal scanner axis $K_2$. The vertical scanner axis $K_1$ is perpendicular to the horizontal scanner axis $K_2$. The controller 243 is configured for controlling oscillations of the first reflective mirror 241 and the second reflective mirror 242. The laser beam 21 moves relative to the brittle nonmetallic substrate 20 along the X-axis via the oscillation of the first reflective mirror 241. The laser beam 21 moves relative to the brittle nonmetallic substrate 20 along the Y-axis via the oscillation of the second reflective mirror 24. Therefore, a linear beam spot 211 can be formed to irradiate on the brittle nonmetallic substrate 20 by the laser cutting device 24.

A contour of the linear beam spot 211 is changed by the laser cutting device 24 according to the predetermined curved cutting path $L_2$, thus making the linear beam spot 211 overlap a part of the predetermined curved cutting path $L_2$ all the time. Simultaneously, a coolant stream 22 moves following the linear beam spot 211, and along the predetermined curved cutting path $L_2$. As a result, a crack is formed in the brittle nonmetallic substrate 20 along the predetermined curved cutting path $L_2$. Finally, the brittle nonmetallic substrate 20 is split along the crack by application of an external mechanical force on the brittle nonmetallic substrate 20.

However, the contour of the linear beam spot 211 need to be continuously changed by the laser cutting device 24 in a cutting process. That is, positions of the first reflective mirror 241 and the second reflective mirror 242 need to be continuously changed. The process of controlling the two reflective mirrors is difficult. In addition, the first reflective mirror 241 and the second reflective mirror 242 not only oscillate about scanner axes $K_1$, $K_2$ respectively, but also move according to the predetermined curved cutting path $L_2$. Thus, the cutting process is error-prong.

Therefore, a brittle nonmetallic workpiece and a method and a laser cutting device for making the same to solve the aforementioned problems is desired.

SUMMARY

In one aspect, an exemplary brittle non-metallic workpiece is made by the laser beam, and a cutting surface of the brittle non-metallic workpiece has no micro-cracks.

In another aspect, an exemplary method for making a brittle non-metallic workpiece includes following steps: focusing a laser beam on the brittle non-metallic substrate to form an elliptic beam spot; driving the laser beam to move along a predetermined curved cutting path, making a center of a major axis of the elliptic beam spot intersecting along the predetermined curved cutting path and the major axis being tangent to the predetermined curved cutting path at the intersecting point; a coolant stream follows the elliptic beam spot to move, thus producing a crack in the brittle non-metallic substrate corresponding to the predetermined curved cutting path; separating the brittle non-metallic substrate along the crack.

Still in another aspect, an exemplary laser cutting device includes a laser source, a lens, a worktable and a controller. The lens is configured for focusing a laser beam emitting from the laser source. The worktable is configured for positioning a workpiece. At least one of the lens and the worktable is rotatable relative to the laser source, the other one of the lens and the worktable is movable relative to the laser source. The controller is configured for controlling a movement or a rotation of the lens and worktable.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present brittle nonmetallic workpiece and a method and a laser cutting device for making the same. Moreover, in the drawings, like reference numerals designate corresponding parts throughout the several views.

DETAILED DESCRIPTION OF THE EMBODIMENTS

Reference will now be made to the drawings to describe preferred embodiments of the present brittle nonmetallic workpiece and a method and a laser cutting device for making the same, in detail.

Figure 1:
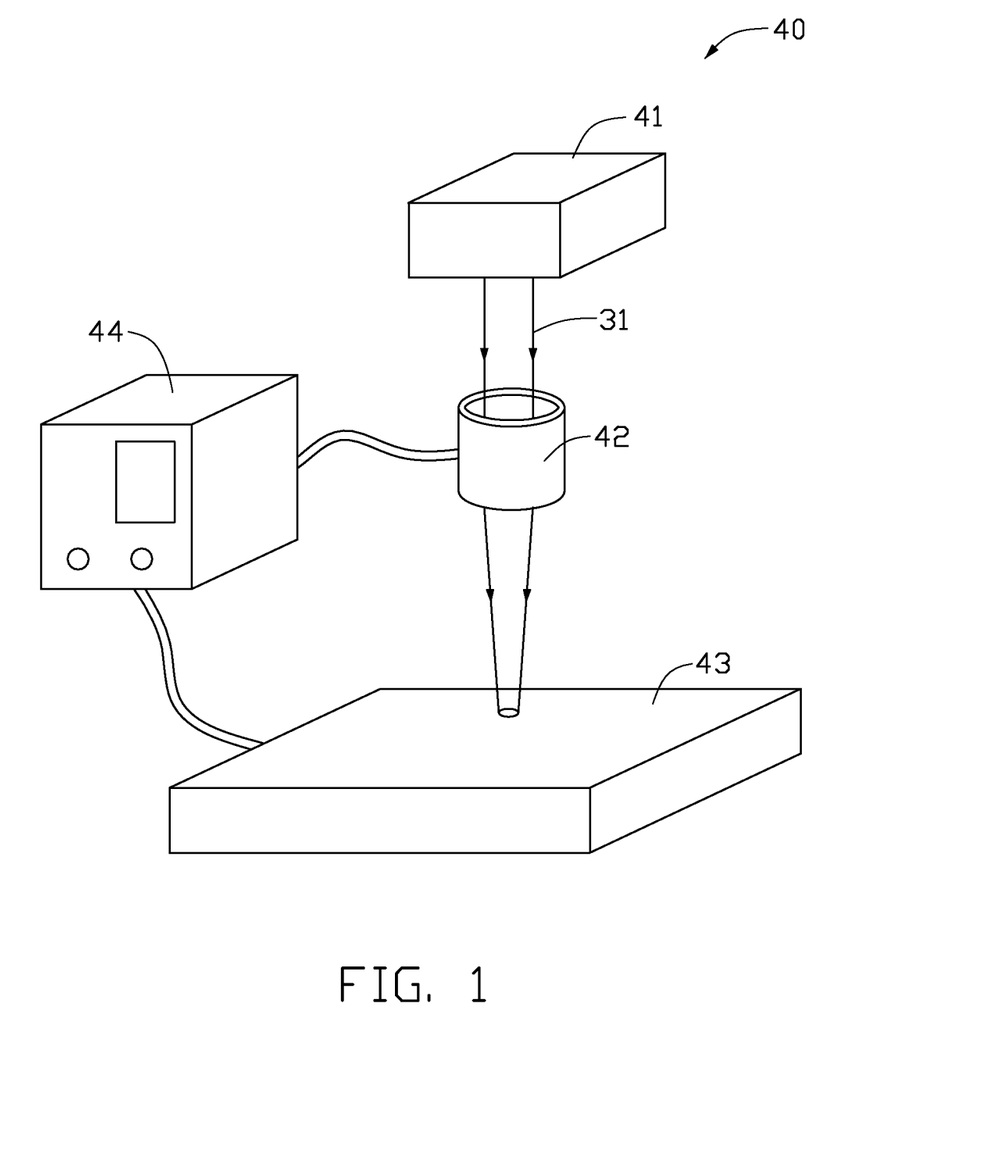
FIG. 1 is an isometric view of a laser cutting device used in a method for cutting a glass substrate in accordance with a first preferred embodiment of the present application.

Referring to FIG. 1, a laser cutting device 40 used in a method for cutting a glass substrate in accordance with a first preferred embodiment is shown. The laser cutting device 40 includes a laser source 41, a lens 42, a worktable 43, and a controller 44. The lens 42 is configured for focusing a laser beam 31 emitted from the laser source 41. The lens 42 is rotatable about the optical axis of the lens 42. The controller 44 is configured for controlling a movement of the lens 42 and the worktable 43.

Figure 2:
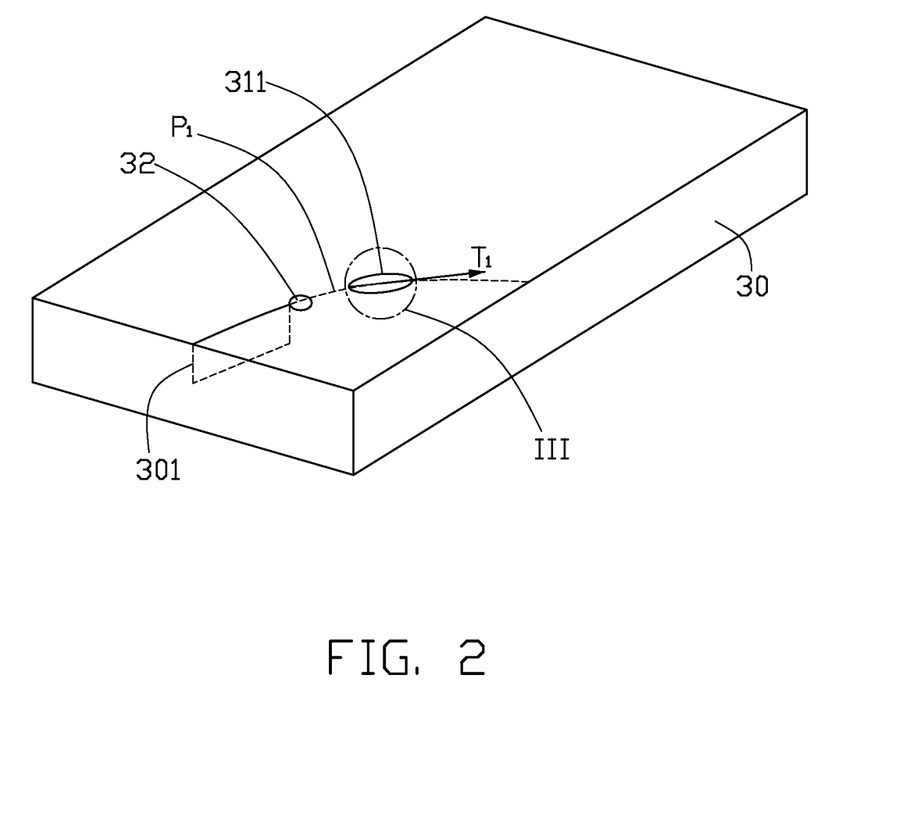
FIG. 2 is an isometric view of the glass substrate being cut along a predetermined cutting curve path by an elliptic laser beam spot.
Figure 3:
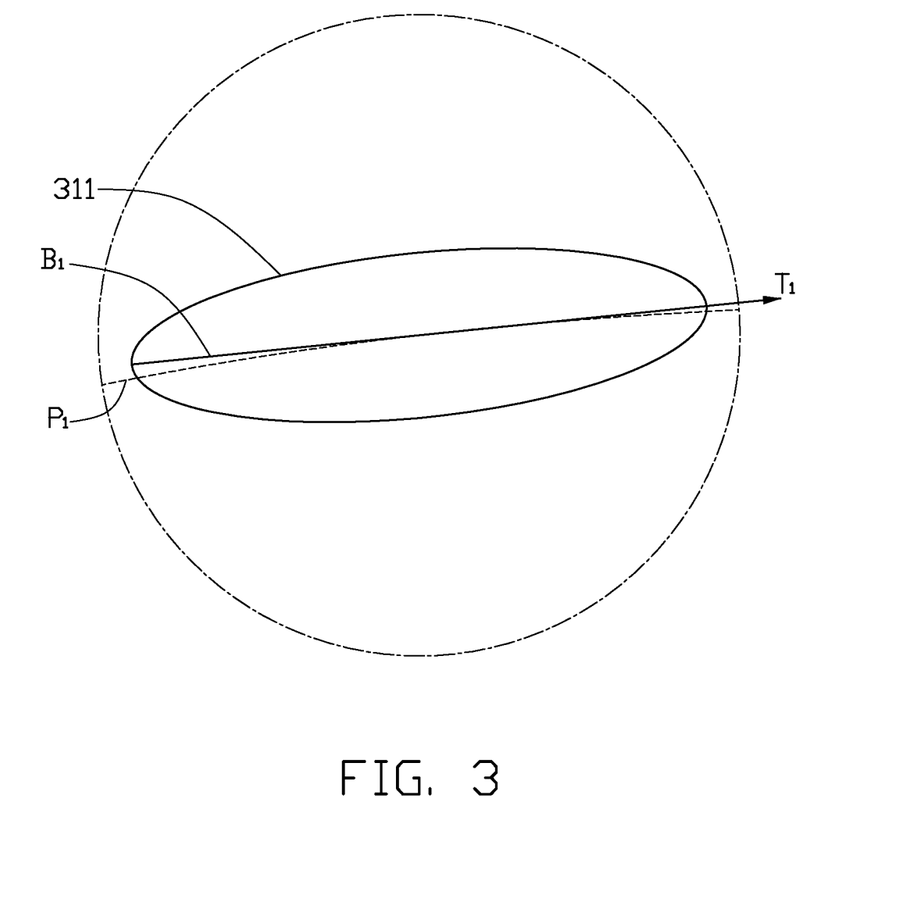
FIG. 3 is an enlarged view of a part III of FIG. 2.

Referring to FIGS. 1 through 3, the method for cutting a glass substrate 30 is described in detail as follows.

(1) A first program is set in the controller 44 for controlling the worktable 43 to move along a predetermined curved cutting path $P_1$. A second program is set in the controller 44 for controlling the lens 42 to rotate according to curvatures of the predetermined curved cutting path $P_1$.

(2) The glass substrate 30 is positioned on the worktable 43. An original crack 301 is engraved on a surface of a glass substrate 30 with a diamond cutter (not shown). The original crack 301 overlaps a starting point of the predetermined curved cutting path $P_1$.

(3) The laser beam 31 emitted from the laser source 41 is focused on the glass substrate 30 by the lens 42, and forms an elliptic beam spot 311.

(4) The controller 44 drives the worktable 43 to move the corresponding predetermined curved cutting path $P_1$ according to the first program. At the same time, the controller 44 also drives the lens 42 to rotate about the optical axis thereof according to the second program. Therefore, when a projection of the elliptic beam spot 311 moves on the glass substrate 30, a center of a major axis $B_1$ of the elliptic beam spot 311 intersects along the predetermined curved cutting path $P_1$ and the major axis $B_1$ is tangent to the predetermined curved cutting path $P_1$ at the intersecting point. Simultaneously, a coolant stream 32 follows the elliptic beam spot 311, and along the predetermined curved cutting path $P_1$ all the time, thus forming a crack corresponding to the predetermined curved cutting path $P_1$ in the glass substrate 30.

(5) The glass substrate 30 is separated along the crack by applying an external mechanical force on the glass substrate 30 correspondingly.

In the cutting process, a contour of the elliptic beam spot 311 is not changed. The controller 44 only drives the worktable 43 to move along the predetermined curved cutting path $P_1$ according to the first program, and drive the lens 42 to rotate according to the second program. Therefore, the laser cutting device 40 is easy to control. In addition, since the major axis $B_1$ of the elliptic beam spot 311 is substantially aligned along a tangent $T_1$ of the predetermined curved cutting path $P_1$, a thermal energy of the elliptic beam spot 311 is always symmetrically distributed on the glass substrate 30 along the predetermined curved cutting path $P_1$ during the cutting process. Thus, the glass substrate 30 made by the aforementioned method has a relatively high cutting precision.

It should be understood that, the first program may be set in the controller 44 for controlling the lens to move along a predetermined curved cutting path $P_1$. The second program may be set in the controller 44 for controlling the lens 42 to rotate according to curvatures of the predetermined curved cutting path $P_1$. Therefore, the major axis $B_1$ of the elliptic beam spot 311 can also be kept aligned along the tangent $T_1$ of the predetermined curved cutting path $P_1$, when the elliptic beam spot 311 moves on the glass substrate 30. In addition, the laser beam 31 can directly cut the glass substrate 30 without forming the original crack 301. But the glass substrate 30 needs more time to be cut, due to a longer period for forming the crack by the elliptic beam spot 311.

Figure 4:
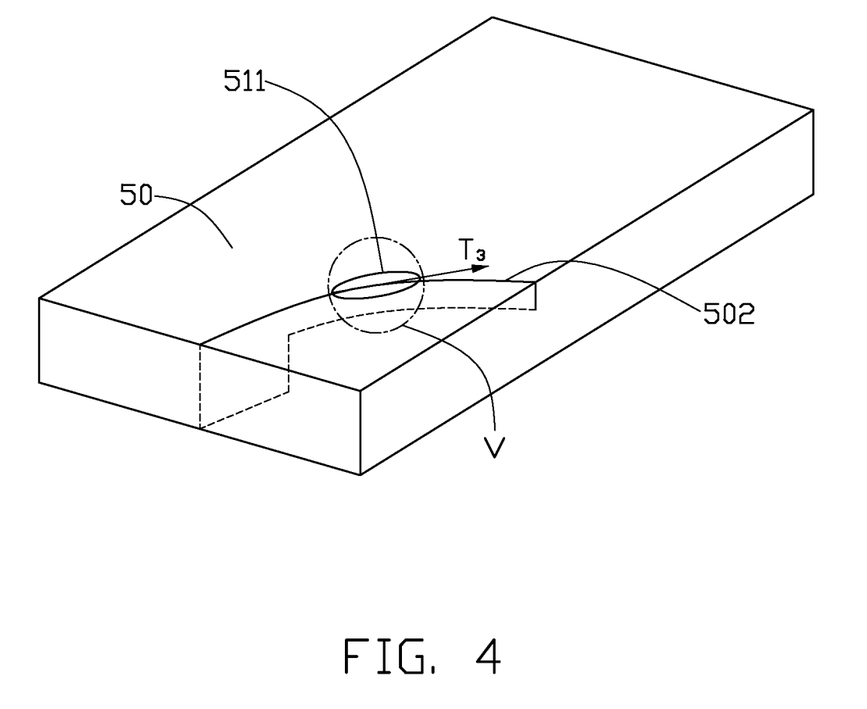
FIG. 4 illustrates a method for cutting a glass substrate in accordance with a second preferred embodiment of the present application, showing the glass substrate being cut along a crack by an elliptic beam spot.
Figure 5:
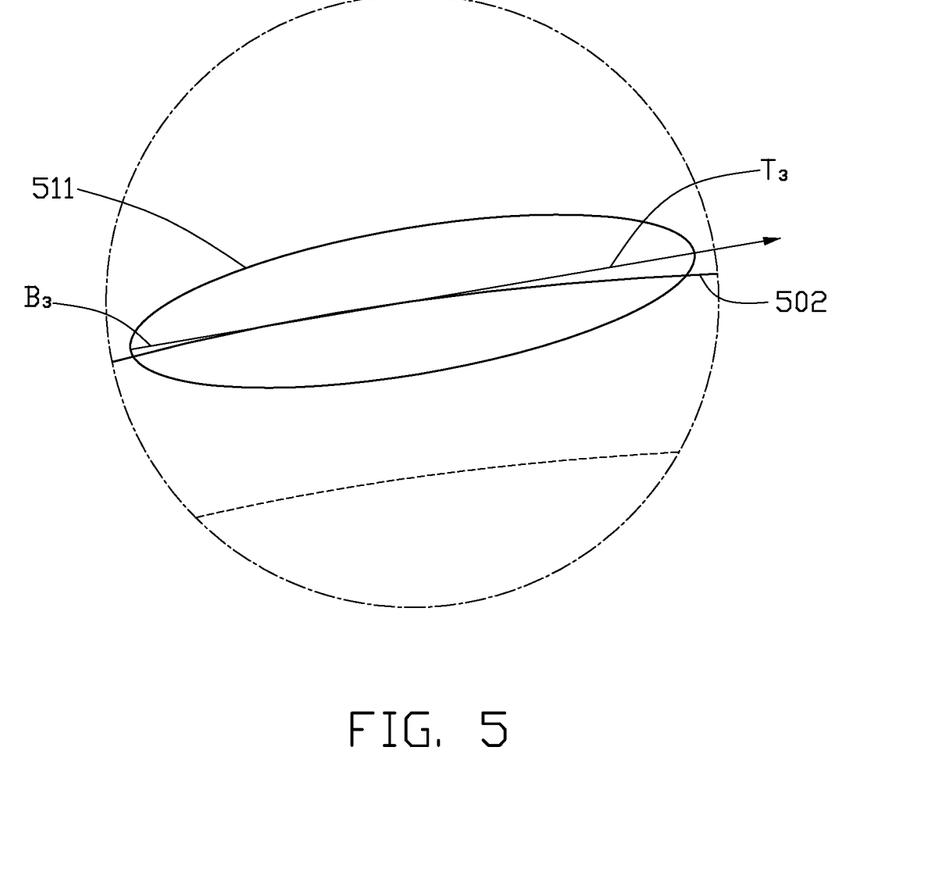
FIG. 5 is an enlarged view of a part V of FIG. 4.

Referring to FIGS. 4 and 5, a method for cutting a glass substrate 50 using a laser cutting device 40 in accordance with a second preferred embodiment is shown. The method for cutting a glass substrate 50 is similar in principle to the method for cutting the glass substrate 30, except that a final step for splitting the glass substrate 50 along a crack 502. After the crack 502 is engraved on the glass substrate 50, the laser beam 31 is focused again, in order to form an elliptic beam spot 511 on the glass substrate 50. The controller 44 drives the worktable 43 to move corresponding crack 502 according to the first program, and drives the lens 42 to rotate about the optical axis thereof according to the second program at the same time. Therefore, a center of a major axis $B_3$ Of the elliptic beam spot 511 intersects along the crack 502 and the major axis $B_1$ is tangent ($T_3$) to the crack 502 at the intersecting point, during a projection of the elliptic beam spot 511 moving on the glass substrate 50. Finally, the glass substrate 50 is separated along the crack 502 by the laser beam 31.

Alternatively, after the crack 502 is formed on the glass substrate 50, the glass substrate 50 can also be split by a high-frequency waves source, such as a ultrasonic source. The ultrasonic source emits ultrasonic, for making the crack 502 further grow into the inner part of the glass substrate 50. Therefore, the glass substrate 50 will be split along the crack 502.

It should be pointed out that, the above-described laser cutting methods can be used for cutting other non-metallic materials, such as sapphire, Irish diamond, chinaware, and monocrystalline silicon. The laser source 30 is preferably a carbon dioxide laser system, and an average output power of the laser source 30 is preferably below 100 watts.

Figure 6:
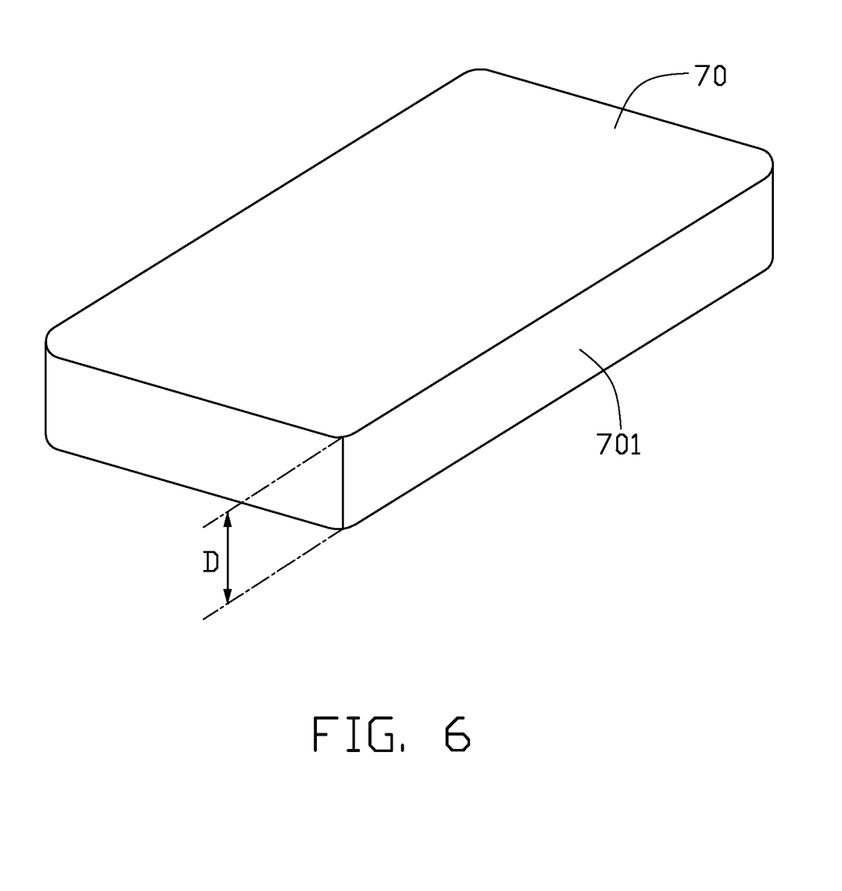
FIG. 6 is an isometric view of a glass workpiece in accordance with a third preferred embodiment of the present application.

Referring to FIG. 6, a glass workpiece 70 in accordance with a third preferred embodiment is shown. The glass workpiece 70 is made by the laser cutting device 40 according to the above-described methods. The glass workpiece 70 is made from natrium, kalium, and silicon dioxide. A thickness D of the glass workpiece 70 is in a range from about 0.2 millimeters to about 6 millimeters. A coefficient of thermal expansion is equal to or more than 3.2×10-6/Kelvin. Furthermore, because the crack 502 of the glass substrate 50 is defined by the laser beam 31, a side cutting surface 701 of the glass workpiece 70 is a lucent curved surface. A roughness of the side cutting surface 701 is equal to or less than 40 nanometers. The roughness of the side cutting surface 701 may possibly be equal to or less than 17 nanometers.

A principle of forming the crack by the laser beam will be described as follow. In engineering application, glass is a brittle non-metallic material. Forming a crack in the glass substrate needs to satisfy a formula of $K_I = K_{IC}$, where $K_I$ is a tension factor dependent on a value of thermal tension. $K_{IC}$ is a toughness factor of the glass substrate, and defined by the organization of the glass substrate. When a temperature of a region of the glass substrate is rapidly changed, a tension region is thus produced. Thermal tensions of different directions in the tension region are dependent on the temperature change and the physical properties of the glass substrate. The tension factor $K_I$ will increase, with the thermal tension increasing. When a maximal tension factor $K_{Imax}$ in the tension region is equal to the splitting toughness factor $K_{IC}$, the crack will be formed along a direction of a maximal thermal tension. Since the beam spot 311 is elliptic, the maximal thermal tension is substantially aligned with the major axis of the beam spot 311. Therefore, the crack formed by the above-described methods is along the predetermined curved cutting path $P_r$.

Figure 7:
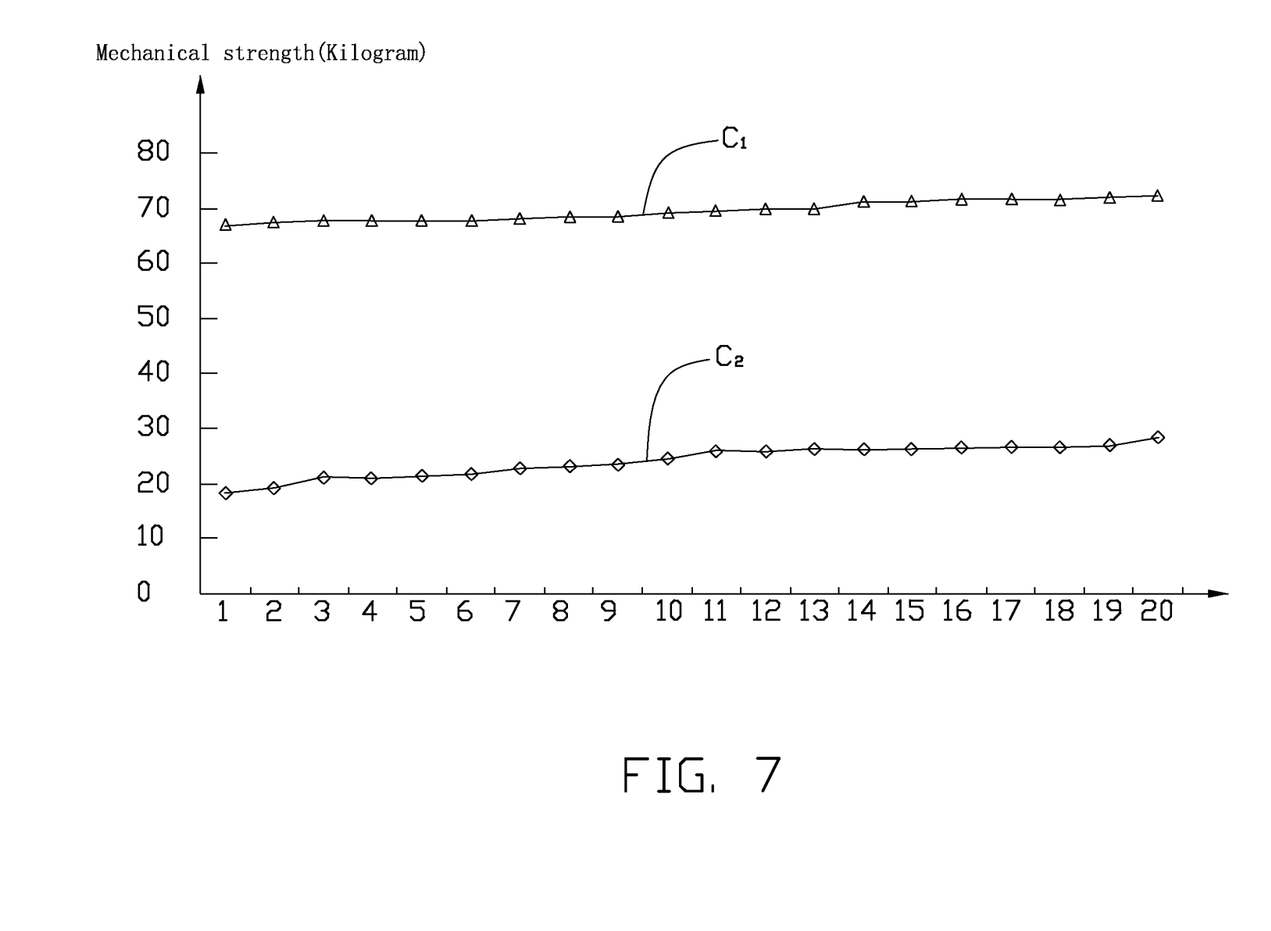
FIG. 7 is a line chart of mechanical strength comparison in respect of glass workpieces cut by the conventional mechanical cutting method and by laser cutting methods of the present invention.

Compared with a conventional glass workpiece made by a conventional mechanical cutting method which mostly includes a scoring step, a splitting step, and a whetting step, the glass workpiece 70 has a higher mechanical strength. To be specific, two glass workpieces with a thickness of 1.6 millimeter are provided and tested, with one made by laser cutting methods of the preferred embodiments and the other one made by the conventional mechanical cutting method. Subsequently, a pressing device applies a first external force on the glass workpiece 70, and the first external force gradually increases till the glass workpiece 70 breaks. Then, the pressing device records a value of the first external force. The pressing device applies a second external force on the conventional glass workpiece, and the second external force gradually increases till the conventional glass substrate breaks. Then, the pressing device records a value of the second external force. Repeating the aforementioned test steps for twenty times, and results of the tests are illustrated in FIG. 7. Curve $C_1$ is obtained by connecting twenty values of the first external force corresponding to the glass workpieces 70. Curve $C_2$ is obtained by connecting twenty values of the second external force corresponding to the conventional glass workpieces.

As shown in FIG. 7, the glass workpiece 70, with a thickness of 1.6 millimeter, has a mechanical strength from about 65 kilograms to about 80 kilograms. The conventional glass substrate of the same thickness, has a mechanical strength from 15 kilograms to 30 kilograms. The conventional mechanical cutting method includes the whetting step to make a cutting surface of the glass substrate being smooth. However, the cutting surface of the conventional glass workpiece still has micro-cracks. When the glass substrate is applied small external force, the glass substrate will break up along the micro-cracks. The cutting surface of the glass workpiece 70 is a lucent surface, that is, there are no micro-cracks on the cutting surface of the glass workpiece 70. Therefore, the glass workpiece 70 has a higher mechanical strength than that of conventional glass substrate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for making a brittle non-metallic workpiece, comprising:

providing a laser cutting device, the laser cutting device having a laser source, a lens, a worktable, and a controller, the lens configured for focusing a laser beam emitting from the laser source, the controller being configured for controlling a movement of the lens and worktable;

positioning a brittle non-metallic substrate on the worktable, focusing the laser beam on the brittle non-metallic substrate by the lens, and forming an elliptic beam spot;

moving the laser cutting device in such way that the center of the major axis of the elliptic beam spot intersects along the predetermined cutting path and the major axis is substantially tangent to the predetermined cutting path at the intersecting point, wherein the controller drives the worktable to move along the predetermined cutting path according to a first program, and drives the lens only to rotate about the optical axis thereof according to a second program at the same time to make the major axis substantially tangent to the predetermined cutting path at the intersecting point;

applying a coolant stream following the elliptic beam spot to move, thus forming a crack in the brittle non-metallic substrate corresponding to the predetermined cutting path; and separating the brittle non-metallic substrate along the crack.

2. The method as claimed in claim 1, wherein before the laser beam moves relative to the worktable, an original crack is formed in the brittle non-metallic substrate by a cutter, the original crack overlaps a starting point of the predetermined curved cutting path.

3. The method as claimed in claim 1, further comprising, after the crack is formed on the brittle non-metallic substrate, moving the laser cutting device again in such way that the center of the major axis of the elliptic beam spot intersects along the predetermined cutting path and the major axis is substantially tangent to the predetermined cutting path at the intersecting point, in order to split the brittle non-metallic substrate along the crack.

4. The method as claimed in claim 1, wherein after the crack is formed in the brittle non-metallic substrate, the brittle non-metallic substrate is split by high-frequency waves emitting from a high-frequency wave source.

5. The method as claimed in claim 4, wherein the high-frequency wave source is an ultrasonic source.

6. The method as claimed in claim 1, wherein the laser source is a carbon dioxide laser system.

7. The method as claimed in claim 6, wherein an average output power of the laser source is below 100 watts.

8. The method as claimed in claim 1, wherein the brittle non-metallic substrate is a glass substrate.

9. The method as claimed in claim 1, wherein the second program is set in the controller according to curvatures of the predetermined cutting path.

10. The method as claimed in claim 1, wherein the laser source is opposite to the worktable, and the lens is positioned between the laser source and the worktable.

\* \* \* \* \*